Sept. 22, 1953
O. M. WHITTEN
2,652,904
TRACTOR AND TRAILER BRAKE SYSTEM
Filed Jan. 12, 1948
3 Sheets-Sheet 1
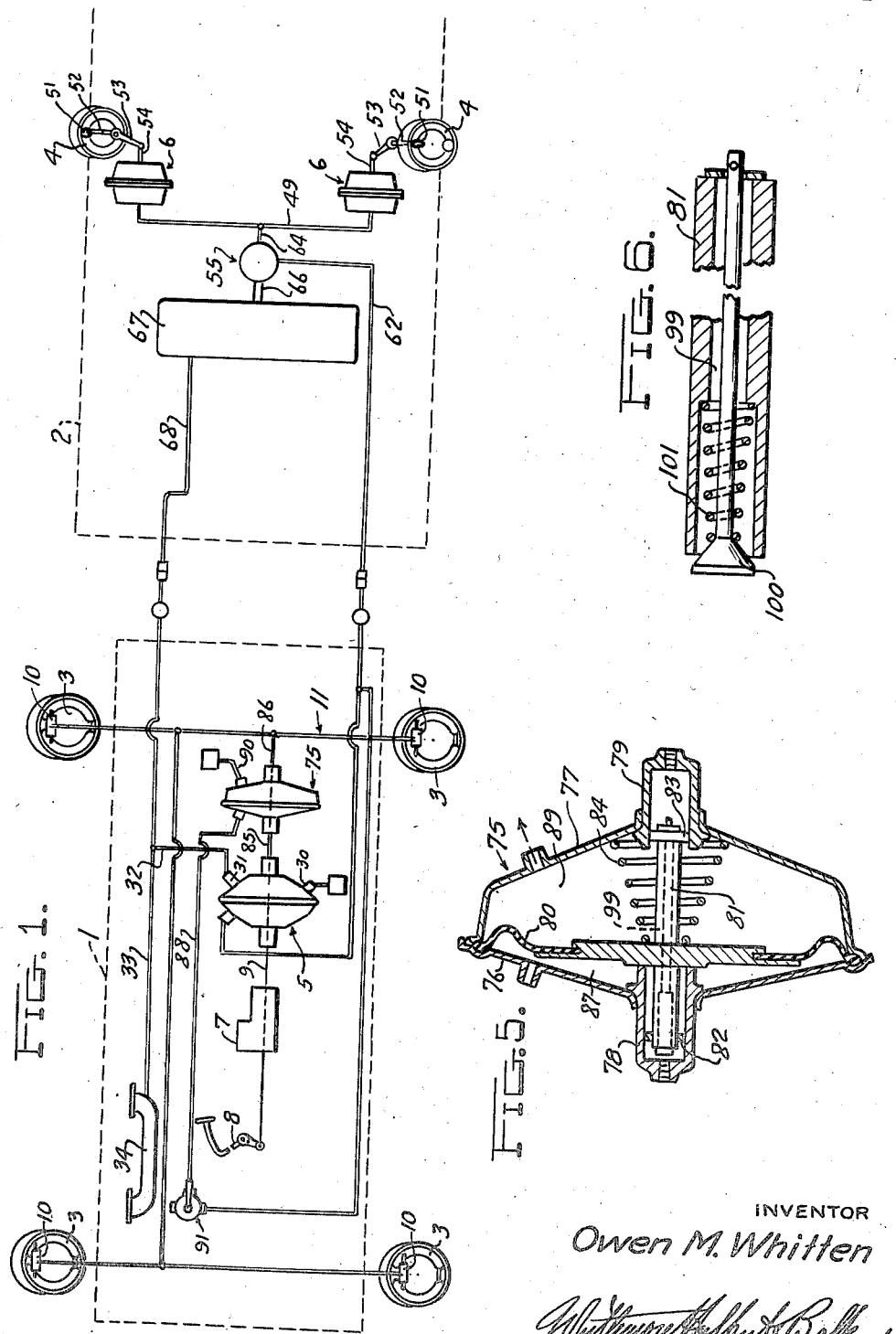
INVENTOR
Owen M. Whitten
BY
ATTORNEYS Sept. 22, 1953
O. M. WHITTEN
2,652,904
TRACTOR AND TRAILER BRAKE SYSTEM
Filed Jan. 12, 1948
3 Sheets-Sheet 2
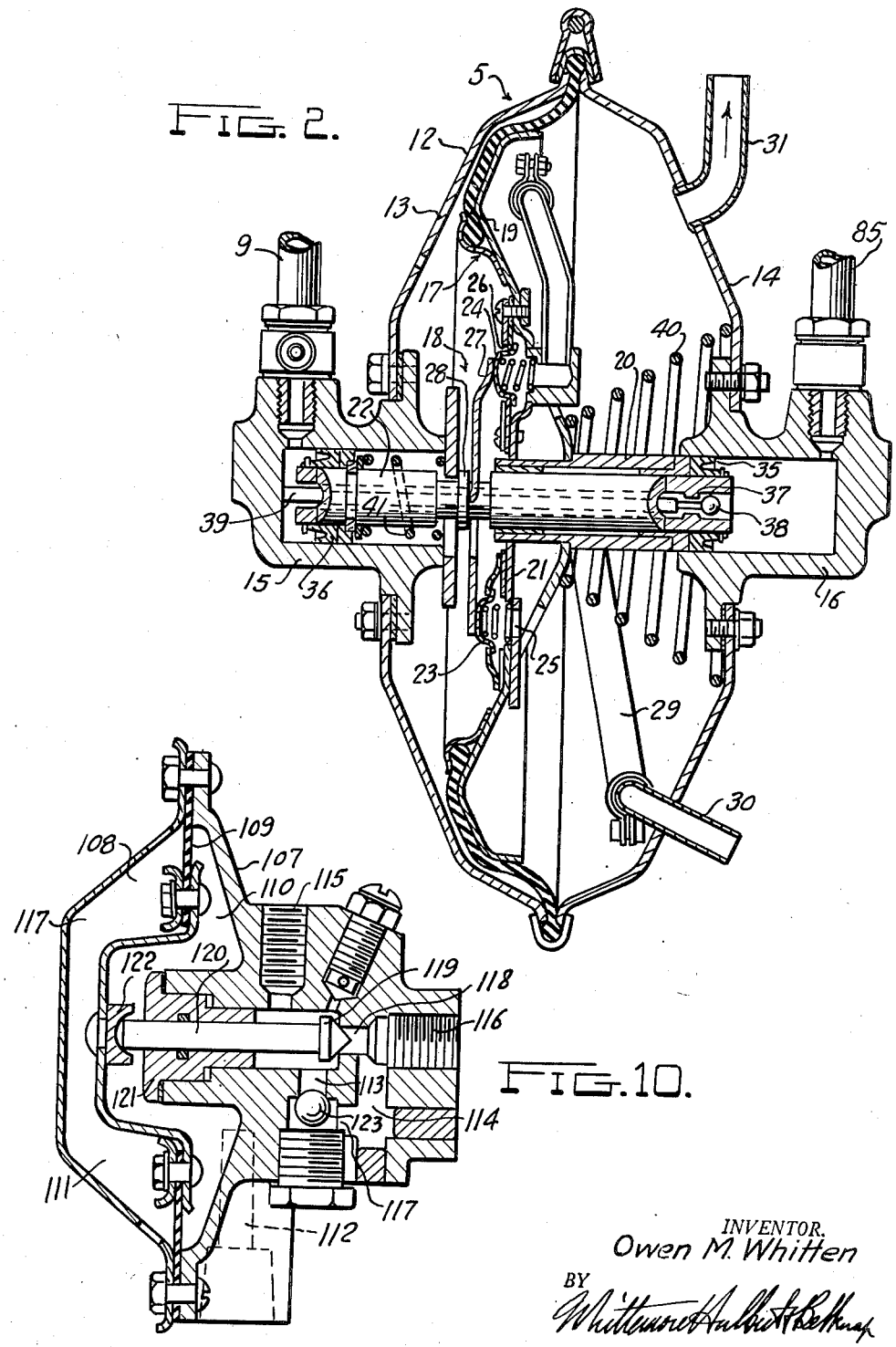
INVENTOR.
Owen M. Whitten
BY
ATTORNEYS Sept. 22, 1953 — O. M. WHITTEN — 2,652,904
TRACTOR AND TRAILER BRAKE SYSTEM
Filed Jan. 12, 1948 — 3 Sheets-Sheet 3
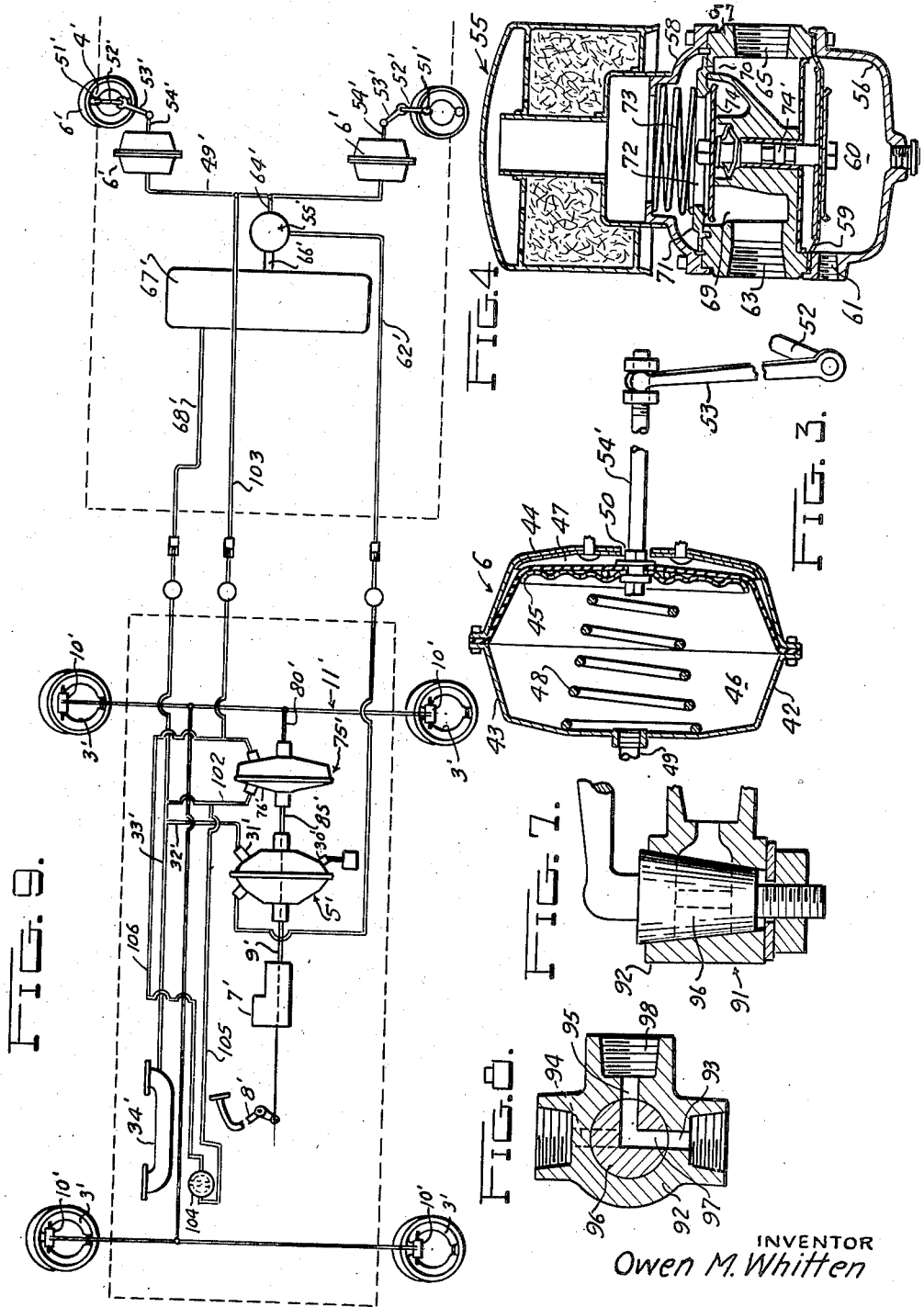
INVENTOR
Owen M. Whitten
ATTORNEYS Patented Sept. 22, 1953

2,652,904

UNITED STATES PATENT OFFICE 2,652,904

TRACTOR AND TRAILER BRAKE SYSTEM

Owen M. Whitten, Detroit, Mich., assignor to Kelsey-Hayes Wheel Company, Detroit, Mich., a corporation of Delaware Application January 12, 1948, Serial No. 1,760

7 Claims. (Cl. 188—3)

The invention relates to tractor and trailer brake systems having separate power devices and has for one of its objects the provision of an improved tractor and trailer brake system embodying means for restraining the tractor power device from power operation for a time interval such that the tractor brake cannot be applied by its power device before the trailer brake is applied by its power device.

The invention has for other objects to provide a tractor and trailer brake system having a device for controlling the power operation of the tractor power device located between the tractor power device and an actuator for a tractor brake; to provide a control device the operation of which is dependent upon the energization of one of the power devices; and to provide a simple construction of control device which may be readily combined in a tractor and trailer brake system.

The invention has for further objects to provide a control device operable by differential pressure and normally exerting a greater force than and opposed to the force exerted by the tractor power device; and to so construct the control device that a portion thereof is in the line for transmitting the braking pressure to a tractor brake.

With these as well as other objects in view, the invention further resides in the novel features of construction and combinations and arrangements of parts as more fully hereinafter set forth.

In the drawings:

Figure 1 is a diagrammatic view of a tractor trailer brake system embodying the invention;

Figure 2 is a sectional view of the tractor power device for operating the tractor brakes;

Figure 3 is a sectional view of the trailer power device for operating the trailer brakes;

Figure 4 is a sectional view of the relay valve;

Figure 5 is a sectional view of the control device for restraining power operation of the tractor power device;

Figure 6 is an enlarged view of a portion of the control device;

Figure 7 is a sectional view of the manually operable control valve;

Figure 8 is a cross section therethrough;

Figure 9 is a diagrammatic view similar to Figure 1 showing a modified tractor trailer brake system;

Figure 10 is a view similar to Figure 5 showing a modified construction of control device.

As illustrated in Figures 1-8 inclusive, the system comprises the tractor 1 and the trailer 2 respectively having the wheel brakes 3 and 4 and the power devices 5 and 6 for operating the respective brakes 3 and 4. The conventional master cylinder 7 mounted on the tractor has its piston (not shown) connected to and operable by the conventional manually operable brake pedal 8 to displace upon operation of the pedal brake fluid into the conduit 9 which is connected to the tractor power device 5. The tractor brakes 3 are adapted to be applied by the wheel cylinders 10 of conventional design which are adapted to receive brake fluid displaced from the conduit line 11 by the tractor power device 5 to which the conduit line is connected.

The tractor power device 5 is preferably of the type shown in the patent to R. J. Klimkiewicz, No. 2,377,699, issued June 5, 1945. This device is of the vacuum suspended type and as shown particularly in Figure 2 has the housing 12 formed of the front and rear sections 13 and 14, the axially aligned low and high pressure cylinders 15 and 16 secured respectively to the front and rear housing sections, the power operable mechanism 17 for displacing brake fluid from the high pressure cylinder and the control mechanism 18 operable by fluid in the low pressure cylinder. The power operable mechanism 17 comprises the diaphragm 19 clamped between the front and rear housing sections and the annular power plunger 20 secured to the central wall 21 of the diaphragm and reciprocable in the high pressure cylinder 16. The control mechanism 18 comprises the control plunger 22 reciprocable in the low pressure cylinder 15 and the power plunger 20, the spring pressed vacuum valve 23 and the spring pressed air valve 24 respectively controlling the ports 25 and 26 in the central wall of the diaphragm and the lever 27 on the control plunger 22 abutting the collar 28 of the latter and the valves. The port 25 is adapted to place in communication the front and rear chambers formed respectively by the front housing section and the diaphragm and the rear housing section and the diaphragm. The port 26 is adapted to place the front chamber in communication with air under atmospheric pressure through the flexible conduit 29 within the rear chamber and the conduit 30 secured to the rear housing section. The rear housing section has secured thereto the conduit 31 which is connected by the conduits 32 and 33 to a source of vacuum such as the intake manifold 34 of the internal combustion engine for driving the tractor. Suitable sealing means 35 and 36 are provided respectively between the high pressure cylinder and the power and control plungers and between the low pressure cylinder and the control plunger. To compensate for expansion and contraction of the brake fluid, the control plunger has an axial passageway therethrough provided with a rearwardly facing seat 37 engageable by the ball valve 38 which in the normal, retracted or off position of the parts of the tractor power device is held from the seat by the rod 39. The parts are held in their normal, retracted or off positions by the coil spring 40 which retracts the power operable mechanism 17 and the coil spring 41 which retracts the control plunger relative to the power operable mechanism.

In operation when brake fluid is forced into the low pressure cylinder 15 of the tractor power device some of the brake fluid is forced through the control plunger 22 into the high pressure cylinder 16 while the remainder of the brake fluid acts upon the sealing means 36 of the control plunger to advance or move the control plunger forwardly relative to the power plunger 20. As the control plunger is advanced its collar 28 acts upon the lever 27 to first move the vacuum valve 23 to closed position thereby closing communication between the front and rear chambers and to then move the air valve 24 to open position allowing air under atmospheric pressure to enter the front chamber. While the air valve is being opened the ball valve 38 engages the seat 37 to close the axial passageway of the control plunger. As the pressure of air in the front chamber builds up and creates a differential pressure the diaphragm 19 is advanced or moved forwardly and advances the power plunger 20 and the sealing means 35 to create high pressure of the brake fluid in the high pressure cylinder 16 which is transmitted to the wheel cylinders 10 to apply the tractor brakes 3.

The trailer power devices 6 are alike and are conventional power chambers of the atmospheric suspended type. Each power chamber comprises the housing 42 formed of the sections 43 and 44 and the diaphragm 45 clamped between the housing sections and forming therewith the chambers 46 and 47. The diaphragm 45 is normally urged to retracted position by the coil spring 48. The chamber 46 is connected to the conduit 49 and the chamber 47 is open to air under atmospheric pressure through the port 50 in the housing section 44. In the present instance, each power device is operatively connected to its trailer wheel brake 4 by mechanical means, the brake actuator being the cam 51. The cam is secured to the rock shaft 52 having the arm 53 connected to the rod 54 which is secured to the diaphragm 45. When the trailer power device is not in operation and its diaphragm is in the retracted position shown in Figure 3, the conduit 49 is open to air under atmospheric pressure so that both chambers 46 and 47 are under atmospheric pressure.

The relay valve 55 mounted on the trailer controls the operation of the trailer power devices by connecting the conduits 49 to air under atmospheric pressure or to a source of vacuum. The relay valve is conventional and as illustrated in Figure 4 comprises a housing formed of the lower section 56, the intermediate section 57 and the upper section 58. 59 is the lower diaphragm clamped between the lower and intermediate housing sections and forming with the lower housing section the chamber 60 which is connected through the port 61 in the lower housing section to the control conduit 62 leading to the front variable pressure chamber of the tractor power device 5. The intermediate housing section 57 is provided with the port 63 which is connected to the conduits 49 by the conduit 64. The intermediate housing section is also provided with the port 65 which is connected to the conduit 66 leading to the vacuum tank 67 which latter is mounted on the trailer and is connected by the conduit 68 to the vacuum conduit 33 on the tractor. The intermediate housing section further has the inner chamber 69 communicating with the port 63 and open at its upper end and the outer annular chamber 70 communicating with the port 65 and open at its upper end. 71 is the upper diaphragm clamped between the intermediate and upper housing sections 57 and 58 and provided with the central port 72 which when open admits air under atmospheric pressure to the chamber 69. This diaphragm is resiliently held downwardly to close the annular chamber 70 by means of the coil spring 73. 74 is a valve within the inner chamber 69 and connected to the lower diaphragm 59 by the rod 74', this valve being of a size such that when it is moved upwardly it engages the upper diaphragm 71 and closes its central port 72.

The construction is such that in the normal or inoperative positions of the parts when the brakes of both the tractor and trailer are retracted, the upper diaphragm 71 closes communication between the ports 63 and 65 but provides for communication of the port 63 with air under atmospheric pressure. During the initial operation of the tractor power device 5 and after the vacuum valve has been closed and the air valve has been opened the increasing pressure of the air in the front variable pressure chamber of the tractor power device is transmitted to the lower chamber 60 of the relay valve through the control conduit 62 and when the pressure in the lower chamber becomes sufficiently high the lower diaphragm 59 and the valve 74 are raised to first close the central port 72 of the upper diaphragm 71 thereby closing communication of the port 63 with air under atmospheric pressure and then when the pressure in the lower chamber is further raised to overcome the pressure exerted by the coil spring 73 and the differential in pressures on the upper diaphragm of air under atmospheric pressure and vacuum or sub-atmospheric pressure in the outer chamber 70, the upper diaphragm is raised thereby placing the port 63 in communication with the port 65 and as a result placing the vacuum tank 67 in communication with the chambers 46 of the trailer power devices 6 after which their diaphragms are moved to apply the trailer brakes through the cams and intermediate connections.

With the above construction, the relay valve controls the energization of the trailer power devices and is dependent for its operation upon the energization of the tractor power device.

For the purpose of controlling the operation of the tractor power device so that it cannot apply the tractor brakes before the trailer power devices have applied the trailer brakes, I have provided means for restraining the tractor power device from power operation, the means as shown in Figures 1, 5 and 6 being the control device 75 operable by differential air pressure and located on the tractor in the conduit line 11 between the tractor device and the wheel cylinders. The control device comprises the front and rear sections 76 and 77 forming the housing, the axially aligned cylinders 78 and 79 mounted on the front and rear housing sections, the movable wall 80 and the plunger 81 extending axially through and secured to the wall and having at its ends the pistons 82 and 83 slidable in the cylinders 78 and 79 respectively. The movable wall is a diaphragm clamped between the housing sections and reinforced by a central plate which is secured to the plunger 81. 84 is a coil spring abutting the housing section 77 and the central plate and urging the latter against the inner end of the cylinder 78 to normally hold the central plate against the inner end of the cylinder 78 and thereby normally hold the diaphragm, plunger and pistons in their retracted positions. The cylinders 78 and 79 are connected to and communicate with the conduits 85 and 86 forming part of the conduit line 11 and leading respectively to the high pressure cylinder 16 of the tractor power device and the portion of the conduit line 11 extending to the wheel cylinders. The front variable pressure chamber 87 of the control device, which is formed by the front housing section and the diaphragm, is connected to the auxiliary control conduit line 88 leading to and communicating with the main control line or conduit 62. The rear chamber 89 of the control device, which is formed by the rear housing section and the diaphragm, is connected to the conduit 90 open to air under atmospheric pressure.

With this construction any pressure of the brake fluid created in the high pressure cylinder of the tractor power device and acting on the wheel cylinders of the tractor brakes is controlled by and must be transmitted through the control device. Also, the control device is operable by differential pressure and is arranged to exert a force opposed to that of the tractor power device and restraining operation of the latter. The restraining force exerted by the control device decreases from maximum to minimum as the force exerted by the tractor power device during power operation increases from minimum to maximum, the restraining force being the greater or stronger until sufficient air has entered the front variable pressure chamber of the control device to decrease the restraining force to less than the force exerted by the tractor power device when energized at which time power operation of the tractor power device begins. The maximum restraining force which the control device exerts is dependent upon the ratio of the effective area of the diaphragm 80 to the internal cross sectional area of the cylinder 78 and within structural limits can be made to any desired magnitude.

To render the control device inoperative so that it cannot exert a force by reason of differential pressure restraining operation of the tractor power device, I have provided the manually operable valve 91 in the auxiliary control conduit line 88 and positioned on the tractor to be readily operable by the driver. This valve, as shown in Figures 7 and 8, has the housing 92 provided with axially aligned ports 93 and 94 and the transverse port 95, the ports 93 and 95 being connected to the conduits forming part of the auxiliary control conduit line and the port 94 being open to air under atmospheric pressure. The valve has its stem 96 provided with the transverse ports 97 and 98 adapted in one predetermined position of the stem to register with the ports 93 and 95 and in the other predetermined position to register with the ports 94 and 95. In the first predetermined position the front variable pressure chamber of the control device communicates with the main control line 62 while in the second predetermined position the front variable pressure chamber of the control device communicates with the air under atmospheric pressure so that the air pressure at opposite sides of the diaphragm is atmospheric and no restraining force can be exerted through the diaphragm. The stem occupies the first predetermined position when the trailer and tractor are connected and the second predetermined position when the trailer and tractor are disconnected.

To assure operation of the control device after the trailer brakes have been applied by the trailer power devices, the control device 75 may be so constructed that with the same amounts of air entering the front variable pressure chamber of the control device and the lower chamber of the relay valve 55, the latter will first operate to cause the trailer brakes to be applied. Also the control device may be so constructed that while air is being admitted to the front variable pressure chamber of the control device and the lower chamber of the relay valve, the relay valve will operate at a lower pressure to cause the trailer brakes to be first applied. Furthermore, the auxiliary control conduit line may be so constructed by varying its length and the internal cross sectional areas of its conduits or of the ports of the valve housing or stem to restrict and retard flow of air therethrough so that during energization of the tractor power device the pressure of air in the front variable pressure chamber of the control device is at any one time lower than the pressure of air in the front variable chamber of the tractor power device. In the present instance, the control device is preferably constructed so that with the air pressure in the front chamber of the control device at any one time substantially the same as that in the lower chamber of the relay valve the latter will first operate to secure power operation of the trailer power devices.

For the purpose of compensating for expansion and contraction of the brake fluid in that portion of the conduit line 11 between the cylinder 79 of the control device 75 and the wheel cylinders 10, the plunger 81 of the control device is formed with the axially extending passageway 99 which is adapted to be closed by the velocity valve 100 upon displacement of brake fluid into the cylinder 78 of the control device. This velocity valve is normally held in open position by the coil spring 101 when the parts of the tractor or trailer brake system are in their normal or retracted positions. Since there is slight clearance between the stem of the velocity valve and the washer encircling the stem and abutting the end of the plunger opposite the head of the valve, the cylinders 78 and 79 are placed in communication in the open position of the velocity valve. Upon initial power application of the tractor power device pressure of the brake fluid in the leading end of the cylinder 78 is initially increased and acts upon the velocity valve to close the same. The velocity valve is then held closed until the tractor brakes are released by removal of pressure from the brake pedal. Thus, displacement of high pressure brake fluid from the tractor power device during its power operation causes tractor brake application by moving the pistons of the control device to displace brake fluid from the cylinder 83 of the control device after air pressure on the two sides of the diaphragm 80 has been sufficiently equalized to permit this movement.

In operation, when the driver of the tractor depresses the foot pedal, brake fluid is displaced into the low pressure cylinder of the tractor power device and causes energization thereof by first closing the vacuum valve and then opening the air valve. Air entering the front variable pressure chamber of the tractor power device increases the pressure in this chamber and this pressure is transmitted to the lower chamber of the relay valve by the main control line and also to the front variable pressure chamber of the control device by the auxiliary control line. The increase in pressure in the lower chamber of the relay valve causes operation of the latter to connect the trailer power devices to the vacuum tank and cause operation of the trailer power devices and consequent operation of the trailer brakes. The increase in pressure in the front variable pressure chamber of the control device reduces the differential pressure acting on the diaphragm of the control device and decreases the restraining force exerted by the control device until finally a point is reached after the power application of the trailer brakes when the force exerted by the diaphragm of the tractor power device upon the power plunger overcomes the restraining force exerted by the control device at which time power operation of the tractor power device begins and the diaphragm, plunger and pistons of the control device are advanced to thereby apply the tractor brakes.

As an example of the operation of a tractor and trailer brake system employing a control device constructed as above described it has been estimated that while the tractor power device is being energized it exerts at one stage a pressure of approximately 400 pounds to the square inch at which time the trailer brakes have been applied by the trailer power devices operating under approximately one-half of the maximum differential pressure and the tractor brakes have not been operated because the control device exerts an opposing force restraining power operation of the tractor power device. However, as the pressure exerted by the power device increases and the restraining pressure exerted by the control device decreases during which time the pressure exerted upon the trailer brakes by the trailer power devices is increased, the tractor brakes are operated and the pressure exerted on the tractor brakes is progressively increased until the maximum pressure which can be exerted by the tractor power device has been reached.

As illustrated in Figure 9, the general construction of the parts which have been designated by corresponding primed reference numerals is the same as that illustrated in Figures 1-8 inclusive but the control device is dependent for its operation upon the pressure in a conduit between one of the trailer power devices and the relay valve for controlling its operation. In this system, the air pressure in the front chamber of the control device is sub-atmospheric while the air pressure in the rear chamber of the control device varies from atmospheric to sub-atmospheric. As shown, the front chamber of the control device is connected by the conduit 102 to the conduit 33' leading to the intake manifold 34' and the rear chamber of the control device is connected by the conduit 103 to the conduit 49' between one of the trailer power devices 6' and the relay valve 55'. With this arrangement the pressure in the rear chamber of the control device varies from atmospheric pressure when the parts of the tractor and trailer brake system are in their normal or retracted positions to sub-atmospheric or vacuum pressure during the operation of the tractor and trailer brake system. Therefore, the differential air pressure acting on the diaphragm of the control device is reduced only upon lowering of pressure in the conduit between one of the trailer power devices and the relay valve and operation of the trailer power devices to apply the trailer brakes. After the differential pressure in the control device has been reduced to a point at which the pressure exerted by the tractor power device overcomes the restraining force exerted by the control device, power operation of the tractor power device begins and the tractor brakes are applied. With this arrangement the tractor brakes can be applied only after the trailer brakes have been applied.

To secure the desired operation of the tractor brakes when the trailer has been disconnected from the tractor, I have provided means for rendering the control device 75' inoperative to restrain the tractor power device 5' from power operation. As shown, 104 is a manually operable valve positioned on the tractor to be readily operated by the driver of the tractor. 105 is a conduit leading from one of the diametrically opposite ports in the valve housing to the conduit 102, and 106 is another conduit leading from the other of the diametrically opposite ports of the valve housing to the tractor portion of the conduit 103. The stem of this valve is provided with a diametrically extending port which extends transversely of the ports in the valve housing when the trailer is connected to the tractor and extends in alignment with the valve housing ports when the trailer is disconnected from the tractor at which time the air pressure in the front and rear chambers of the control device is the same, it being sub-atmospheric, so that the control device does not exert any force created by differential pressure restraining the tractor power device from power operation.

7. The control device illustrated in Figure 10 differs from the control device 75 in that it controls rather than eliminates direct communication between the tractor wheel cylinders and the tractor power device. In detail, 107 and 108 are co-operating front and rear housing sections of the control device having clamped therebetween the diaphragm 109 which forms with the front and rear sections the front and rear chambers 110 and 111. The chamber 110 is connected by the port 112 to the control line between the tractor power device and the relay valve while the chamber 111 is in communication with air under atmospheric pressure. The front housing section 107 is provided with the spaced chambers 113 and 114 extending transversely thereof. The transverse port 115 communicates with the chamber 113 and is connected to the conduit leading to the wheel cylinders for actuating the tractor brakes and the axial port 116 communicates with the chamber 114 and is connected to the conduit leading from the high pressure cylinder of the tractor power device. The front housing section is also provided with the port 117 for placing the chambers 113 and 114 in communication and with the port 118 in axial alignment with the port 116 for placing this port in direct communication with the chamber 113. The port 118 is controlled by the valve 119 having the stem 120 slidable in the gland 121 in the front housing section and abutting the member 122 secured to the axial portion of the diaphragm 109. The port 117 is adapted to be closed by the velocity ball valve 123 which in the normal or retracted positions of the parts is unseated to compensate for expansion and contraction of the brake fluid in the conduit leading to the tractor wheel cylinders. However, when brake fluid is forced from the tractor power device, this ball valve automatically seats immediately.

With this construction of control device the port 118 in the normal or retracted positions of the parts is closed by the valve 119 but as before mentioned the ball valve 123 is open to provide for the required compensation. However, when the operator depresses the foot pedal to energize the tractor power device and the trailer power devices the control device by reason of its diaphragm operated valve exerts a restraining force preventing power operation of the tractor power device until after the trailer power devices have applied the trailer brakes, in the same manner as above described with reference to Figures 1-8 inclusive after which the differential pressure in the control device is reduced sufficiently to permit its diaphragm restrained valve to be opened permitting brake fluid to be displaced and the pressure of brake fluid created by the tractor power device to be transmitted to the tractor wheel cylinders.

What I claim as my invention is:

1. In a tractor and trailer brake system, a vacuum suspended power device operable by differential air pressure for operating a tractor brake, an atmospheric suspended power device operable by differential air pressure for operating a trailer brake, a relay valve for controlling operation of said trailer power device, a control line between said tractor power device and relay valve to transmit air pressure from the former upon energization thereof to the latter, a control device operable by differential air pressure for restraining power operation of said tractor power device, said control device comprising a housing and a diaphragm within and cooperating with said housing to form chambers at opposite sides of said diaphragm, said diaphragm being normally subject on one side to air at atmospheric pressure and on the opposite side to air at sub-atmospheric pressure opposing power operation of said tractor power device, and means for connecting the chamber at said opposite side to said control line to increase the air pressure in said last mentioned chamber and progressively reduce the difference in pressures of air at opposite sides of said diaphragm whereby said control device exerts a progressively decreasing force becoming less than that of said tractor power device when energized to permit power operation of said tractor power device.

2. In a tractor and trailer brake system, a vacuum suspended power device operable by differential air pressure for operating a tractor brake, an atmospheric suspended power device operable by differential air pressure for operating a trailer brake, a relay valve for controlling operation of said trailer power device, a control line between said tractor power device and relay valve to transmit air pressure from the former upon energization thereof to the latter, a control device operable by differential air pressure for restraining power operation of said tractor power device, said control device comprising a housing and a diaphragm within and cooperating with said housing to form chambers at opposite sides of said diaphragm, said diaphragm being normally subject on one side to air at atmospheric pressure and on the opposite side to air at sub-atmospheric pressure opposing power operation of said tractor power device, and means for connecting the chamber at said opposite side to said control line to increase the air pressure in said last mentioned chamber and progressively reduce the difference in pressures of air at opposite sides of said diaphragm whereby said control device exerts a progressively decreasing force becoming less than that of said tractor power device when energized to permit power operation of said tractor power device, said relay valve requiring for operation an amount of air less than that required in said last mentioned chamber providing for operation of said control device and power operation of said tractor device.

3. In a tractor and trailer brake system, mechanism for operating a tractor brake comprising a power device having a power operable member and an operative connection between said power operable member and the tractor brake, mechanism for operating a trailer brake energizable upon energization of said first mentioned power device, said second mentioned mechanism comprising a second power device and an operative connection between said second power device and the trailer brake, an operative connection leading from said first mentioned power device for controlling operation of said second mentioned mechanism, and a control device for restraining movement of said power operable member comprising a housing, a member within said housing normally opposing movement of said power operable member and an operative connection between said control device and one of said second mentioned and third mentioned operative connections for controlling operation of said control device.

4. In a tractor and trailer brake system, a vacuum suspended power device operable by differential air pressure for operating a tractor brake, an atmospheric suspended power device operable by differential air pressure for operating a trailer brake, a relay valve for controlling the operation of said trailer power device, a control air pressure line between said tractor power device and relay valve, a vacuum air pressure line between said relay valve and trailer power device and a differential air pressure operated device for restraining power operation of said tractor power device comprising a housing and a diaphragm within and cooperating with said housing to form chambers at opposite sides of said diaphragm, said diaphragm being subject to air at different pressures in said chambers normally opposing power operation of said tractor power device, and an air pressure line connecting one of said first mentioned lines with one of said last mentioned chambers.

5. In a tractor and trailer brake system, a differential air pressure operated power device for operating a tractor brake, a differential air pressure operated power device for operating a trailer brake, a relay valve for controlling operation of said trailer power device, air pressure transmitting lines between said tractor power device and relay valve and between said relay valve and trailer power device, a differential air pressure operated control device for restraining power operation of said tractor power device comprising a housing and a movable wall within and cooperating with said housing to form chambers at opposite sides of said wall, said wall being subject to air at different pressures in said chambers normally opposing power operation of said tractor power device, and an air pressure transmitting line connecting one of said chambers of said control device and one of said first mentioned lines for progressively reducing the differences in pressures of air at opposite sides of said wall whereby said control device exerts a progressively decreasing force becoming less than that of said tractor power device to permit power operation of said tractor power device.

6. In a tractor and trailer brake system, a differential air pressure operated power device for operating a tractor brake, a differential air pressure operated power device for operating a trailer brake, a relay valve for controlling operation of said trailer power device, air pressure transmitting lines between said tractor power device and relay valve and between said relay valve and trailer power device, a differential air pressure operated control device for restraining power operation of said tractor power device comprising a housing and a movable wall within and cooperating with said housing to form chambers at opposite sides of said wall, said wall being subject to air at different pressures in said chambers normally opposing power operation of said tractor power device, and an air pressure transmitting line connecting one of said chambers of said control device and said line between said trailer power device and relay valve for progressively reducing the differences in pressures of air at opposite sides of said wall whereby said control device exerts a progressively decreasing force becoming less than that of said tractor power device to permit power operation of said tractor power device.

7. In a tractor and trailer brake system, a power device operable by differential pressure for operating a tractor brake, a power device operable by differential pressure for operating a trailer brake, a relay valve controlled by energization of said tractor power device for controlling energization of said trailer power device, a control device operable by differential pressure normally opposing and restraining power operation of said tractor power device, and means for varying the differential pressure of said control device in accordance with the variation in differential pressure of said tractor power device during power operation of the latter.

OWEN M. WHITTEN.

References Cited in the file of this patent

UNITED STATES PATENTS

| Number | Name | Date |
|---|---|---|
| 2,062,500 | Casler et al. | Dec. 1, 1936 |
| 2,161,642 | Stroup | June 6, 1939 |
| 2,182,047 | Eaton | Dec. 5, 1939 |
| 2,275,255 | Freeman | Mar. 3, 1942 |
| 2,305,638 | Rockwell | Dec. 22, 1942 |
| 2,352,001 | Oliver | June 20, 1944 |
| 2,429,194 | Price | Oct. 14, 1947 |

FOREIGN PATENTS

| Number | Country | Date |
|---|---|---|
| 512,436 | Great Britain | Sept. 15, 1939 |